(12) United States Patent
Harrington et al.

(10) Patent No.: US 9,878,444 B1
(45) Date of Patent: Jan. 30, 2018

(54) REACHING AND GRASPING TOOL WITH IMPROVED GRIPPING HEADS

(71) Applicant: Unger Marketing International, LLC, Bridgeport, CT (US)

(72) Inventors: William Harrington, Charlestown, RI (US); Robert F. Smith, Waterbury, CT (US); Paul H. Adams, Monroe, CT (US)

(73) Assignee: Unger Marketing International, LLC, Bridgeport, CT (US)

( * ) Notice: Subject to any disclaimer, the term of this patent is extended or adjusted under 35 U.S.C. 154(b) by 0 days.

(21) Appl. No.: 15/387,722

(22) Filed: Dec. 22, 2016

(51) Int. Cl.
*B25J 1/04* (2006.01)
*B25J 15/12* (2006.01)

(52) U.S. Cl.
CPC *B25J 1/04* (2013.01); *B25J 15/12* (2013.01)

(58) Field of Classification Search
CPC ...... A47F 13/06; B25J 1/02; B25J 1/04; B25J 15/0052; B25J 15/12
USPC ............................ 294/2, 209, 210, 99.1, 902
See application file for complete search history.

(56) References Cited

U.S. PATENT DOCUMENTS

| | | |
|---|---|---|
| 409,949 A | 8/1889 | Foster |
| 437,466 A | 9/1890 | Vogel |
| 652,077 A | 6/1900 | Burson |
| 682,021 A | 9/1901 | Bennett |
| 1,225,188 A | 5/1917 | Smith |
| 1,328,063 A | 1/1920 | St. John |
| 1,501,965 A | 7/1924 | Moors |
| 2,239,108 A | 4/1941 | Lindemann |
| 2,510,584 A | 6/1950 | Kanagawa |
| 2,739,008 A * | 3/1956 | Renner ............... B25J 1/04 294/23 |
| 2,905,498 A * | 9/1959 | Lunde ............... B25J 1/04 294/104 |
| 3,050,327 A | 8/1962 | Kuntz |
| 4,162,132 A | 7/1979 | Kress |
| D279,348 S | 6/1985 | Clivio |
| 4,740,025 A * | 4/1988 | Nelson ............... B01L 9/50 294/902 |
| 5,431,467 A | 7/1995 | Mlecka |
| 5,636,443 A | 6/1997 | Linden |
| 5,797,633 A | 8/1998 | Katzer |
| 6,015,174 A * | 1/2000 | Raes ............... B25J 15/0253 294/119.1 |
| 6,338,512 B1 | 1/2002 | Ruppert |
| 6,520,556 B1 | 2/2003 | Hsu |
| 6,634,435 B2 | 10/2003 | Saeger |
| 6,647,627 B2 | 11/2003 | Nickel |
| 6,739,637 B2 | 5/2004 | Hsu |
| 6,966,269 B2 | 11/2005 | Sawatzky |

(Continued)

FOREIGN PATENT DOCUMENTS

DE 202006003032 4/2006

*Primary Examiner* — Dean J Kramer
(74) *Attorney, Agent, or Firm* — Ohlandt, Greeley, Ruggiero & Perle, LLP

(57) ABSTRACT

A reaching and grabbing tool is provided that has gripping head with at least one jaw operatively connected to a trigger for movement with respect to a gripping axis. The gripping head defines at least one region configured to provide a plurality of gripping states. The gripping head can have more than one jaw that each move with respect to the gripping axis. The plurality of gripping states can include three different gripping states.

22 Claims, 9 Drawing Sheets

(56) References Cited

U.S. PATENT DOCUMENTS

| | | | |
|---|---|---|---|
| 7,073,261 B1 | 7/2006 | Collins | |
| 7,344,171 B1 * | 3/2008 | McMullan | B25B 7/12 |
| | | | 294/111 |
| 8,414,043 B2 | 4/2013 | Albin | |
| 9,004,563 B2 | 4/2015 | Buzby | |
| 9,033,385 B2 | 5/2015 | Sgroi, Jr. | |
| 2010/0164243 A1 * | 7/2010 | Albin | B66F 9/065 |
| | | | 294/106 |
| 2013/0256380 A1 | 10/2013 | Schmid | |
| 2014/0183887 A1 | 7/2014 | Wyles | |
| 2015/0257839 A1 * | 9/2015 | Vause | A61B 17/22032 |
| | | | 606/130 |
| 2016/0001442 A1 | 1/2016 | Buzby | |

* cited by examiner

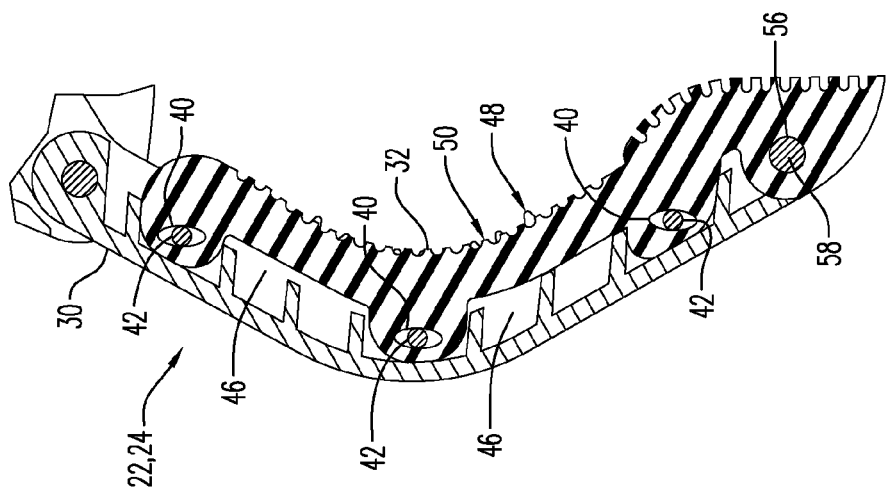
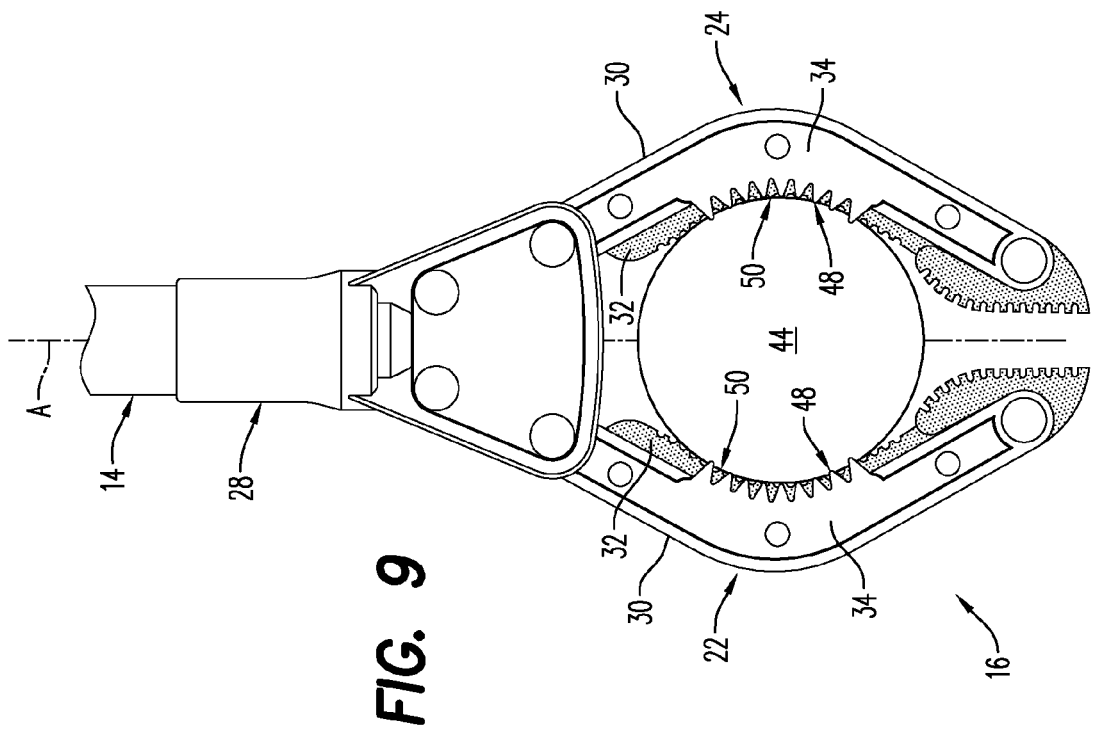

REACHING AND GRASPING TOOL WITH IMPROVED GRIPPING HEADS

BACKGROUND

1. Field of the Invention

The present disclosure is related to reaching and grasping tools. More particularly, the present disclosure is related to reaching and grasping tools that have improved gripping heads.

2. Related Art

Reaching and grasping tools have proven useful to extend the reach of users to, for example, grasp items above the user (e.g., on a shelf) or below the user (e.g., on the ground).

The tools are known to be configured with pistol or trigger style grips as in Applicant's commercially available NiftyNabber® Trigger Grip device and in Applicant's U.S. Pat. No. D617619, which is incorporated by reference. The tools are also known to be configured with inline style grips as in Applicant's commercially available NiftyNabber® Pro device.

Additionally, the tools are known to be configured with one or more features such as rotating gripping heads, telescoping extensions, and others.

It has been determined by the present disclosure that the gripping heads of many prior devices limit the utility of the device. Accordingly, there is a need for reaching and gasping tools with improved gripping heads that provide improved grasping of different items in a manner that that overcome, alleviate, and/or mitigate one or more of the aforementioned and other deleterious effects of prior art tools.

SUMMARY

A reaching and grabbing tool is provided that has gripping head with at least one jaw operatively connected to a trigger for movement with respect to a gripping axis. The gripping head defines at least one region configured to provide a plurality of gripping states.

In some embodiments either alone or in combination with one or more of the afore and/or after mentioned embodiments, the gripping head further defines at least one different region configured to provide a single gripping state.

In some embodiments either alone or in combination with one or more of the afore and/or after mentioned embodiments, the gripping head has more than one jaw, wherein the more than one jaws are each configured for movement with respect to the gripping axis.

In some embodiments either alone or in combination with one or more of the afore and/or after mentioned embodiments, the plurality of gripping states includes three different gripping states.

A reaching and grabbing tool is also provided that includes a trigger assembly, a gripping head, and an extension. The trigger assembly has a trigger and a handle. The gripping head has at least one jaw operatively connected to the trigger for movement with respect to a gripping axis. The extension operatively connects the trigger assembly and the gripping head. The gripping head has at least one jaw of the gripping head including a main member, a first-grip member, and a second-grip member. The first and second grip members are secured to the main member along a region of the gripping axis so that the first-grip member extends towards the gripping axis more than the second-grip member in a normal or unactuated state and so that the first-grip member elastically moves with respect to main and second-grip members in a direction away from gripping axis based on a gripping pressure exerted on an item being gripped to provide a plurality of different gripping states in the region.

In some embodiments either alone or in combination with one or more of the afore and/or after mentioned embodiments, more than one jaw of the gripping head are configured for movement about the gripping axis.

In some embodiments either alone or in combination with one or more of the afore and/or after mentioned embodiments, more than one jaw of the gripping head includes the main member, the first-grip member, and the second-grip member.

In some embodiments either alone or in combination with one or more of the afore and/or after mentioned embodiments, the at least one jaw that includes the main member, the first-grip member, and the second-grip member is the same as the at least one jaw that is operatively connected to the trigger.

In some embodiments either alone or in combination with one or more of the afore and/or after mentioned embodiments, the plurality of different gripping states includes a first gripping state in which only the first-grip member contacts the item.

In some embodiments either alone or in combination with one or more of the afore and/or after mentioned embodiments, the plurality of different gripping states includes a second gripping state in which the first-grip member and the second-grip member contacts the item.

In some embodiments either alone or in combination with one or more of the afore and/or after mentioned embodiments, the plurality of different gripping states includes a third gripping state in which the first-grip member contacts the item and a portion of the second-grip member is embedded in and/or deforms the item.

In some embodiments either alone or in combination with one or more of the afore and/or after mentioned embodiments, the portion includes a plurality of teeth.

In some embodiments either alone or in combination with one or more of the afore and/or after mentioned embodiments, the region is a central region of the gripping head.

In some embodiments either alone or in combination with one or more of the afore and/or after mentioned embodiments, the region is a terminal region of the gripping head.

In some embodiments either alone or in combination with one or more of the afore and/or after mentioned embodiments, the region is a central region and a terminal region of the gripping head.

In some embodiments either alone or in combination with one or more of the afore and/or after mentioned embodiments, the first and second grip members are secured to the main member along another region of the gripping axis so that the first-grip member only compressibly moves with respect to the main and second-grip members in a direction away from the gripping axis based on the gripping pressure to provide a single gripping state in the other region.

In some embodiments either alone or in combination with one or more of the afore and/or after mentioned embodiments, the region is a central region of the gripping head and the other region is a terminal region of the gripping head.

In some embodiments either alone or in combination with one or more of the afore and/or after mentioned embodiments, the handle extends at an angle from an extension axis defined by the extension.

In some embodiments either alone or in combination with one or more of the afore and/or after mentioned embodiments, the tool further includes a telescoping device configured to allow the extension to be lengthened or shortened along an extension axis defined by the extension.

In some embodiments either alone or in combination with one or more of the afore and/or after mentioned embodiments, the tool further includes a rotation device configured to allow the gripping head to rotate about an extension axis defined by the extension.

In some embodiments either alone or in combination with one or more of the afore and/or after mentioned embodiments, the second-grip member includes one second-grip member on an upper side of the main member and one second-grip member on a lower side of the main member.

In some embodiments either alone or in combination with one or more of the afore and/or after mentioned embodiments, the second-grip member includes metal.

In some embodiments either alone or in combination with one or more of the afore and/or after mentioned embodiments, the first-grip member includes an elastomeric material.

In some embodiments either alone or in combination with one or more of the afore and/or after mentioned embodiments, the first-grip member further includes teeth.

In some embodiments either alone or in combination with one or more of the afore and/or after mentioned embodiments, the gripping head includes a spring that provides for the elastic movement between the first and second grip members.

The above-described and other features and advantages of the present disclosure will be appreciated and understood by those skilled in the art from the following detailed description, drawings, and appended claims.

DESCRIPTION OF THE DRAWINGS

FIG. 9 illustrates the gripping head of FIG. 3 in a third actuated state;

FIG. 10 illustrates the gripping head of FIG. 9 having certain portions removed for clarity;

DETAILED DESCRIPTION

Figure 1:
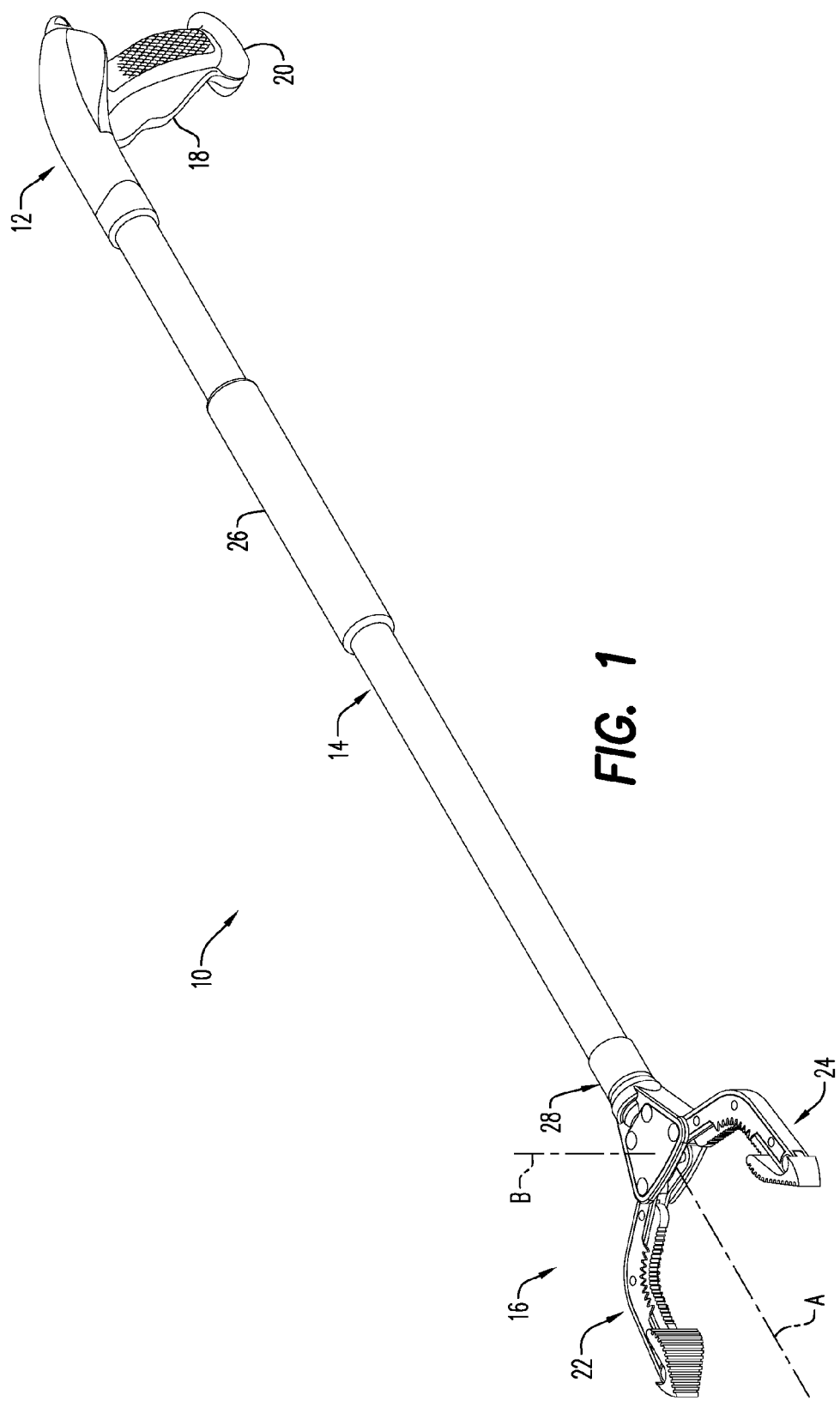
FIG. 1 is a front perspective view of an exemplary embodiment of a reaching and grasping tool according to the present disclosure in a normal or unactuated state.
Figure 2:
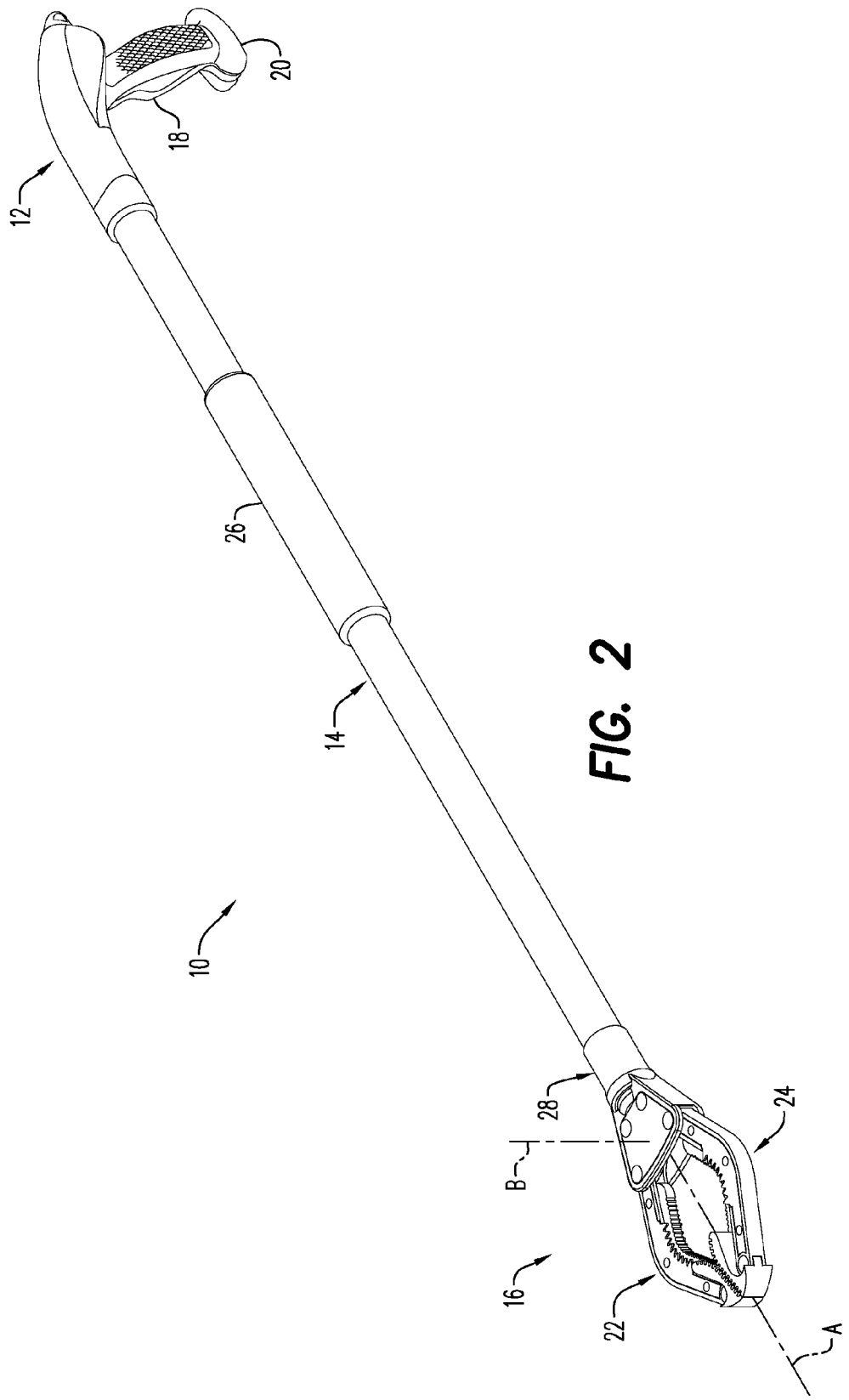
FIG. 2 is a front perspective view of the tool of FIG. 1 in an actuated state.

Referring to the drawings and in particular to FIGS. 1 and 2, an exemplary embodiment of a reaching and grabbing tool is shown and is referred to by reference numeral 10. Tool 10 includes a trigger assembly 12, an extension 14, and a gripping head 16.

Advantageously, gripping head 16 is configured to provide a plurality of gripping states, where each gripping state applies a different type of gripping force to an item being grasped. In this manner, tool 10 is configured for use with a larger variety of items than previously possible.

Trigger assembly 12 includes an actuating trigger 18 and a handle 20. In the illustrated embodiment, trigger assembly 12 is shown as a pistol or trigger style in which handle 20 extends at an angle from an axis A of extension 14. The angle of handle 20 with respect to extension axis A in the pistol style design can be any non-zero angle, with an approximately perpendicular angle being preferred. Of course, it is contemplated by the present disclosure for trigger assembly to be configured as an inline style in which handle 20 extends along extension axis A. In the illustrated embodiment, extension 14 is shown by way of example as having a single extension axis A. However, it is contemplated by the present disclosure for extension 14 to have one or more bends and/or to be bendable. Thus, the extension axis A when referencing trigger assembly 12 is defined as the axis through extension 14 in the region of the trigger assembly.

Gripping head 16 includes a jaw members 22, 24 operatively coupled to trigger 18 so as to move or pivot the jaw members towards and away from a grip axis B between an un-actuated position (FIG. 1) and an actuated position (FIG. 2) in response to movement of the trigger. As used herein, the term grip axis B refers to the axis or plane towards which gripping head 16 moves so as to grip an item 44 placed therein.

It should be recognized that gripping head 16 is described by way of example as having trigger 18 operatively coupled to two jaw members 22, 24 for movement with respect to the grip axis B.

Of course, it is contemplated by the present disclosure for tool 10 to be configured such that one jaw member 22, 24 is stationary, with the other jaw member 22, 24 being movable. In this embodiment, the movable jaw member 22 or 24 is operatively coupled to trigger 18 so as to move that jaw member 22 or 24 between the un-actuated position (FIG. 1) and the actuated position (FIG. 2) in response to movement of the trigger.

In some embodiments, tool 10 can include a telescoping device 26 and/or a rotation device 28.

Telescoping device 26 is configured to allow extension 14 to be lengthened or shortened along extension axis A. Again, in the illustrated embodiment, extension 14 is shown by way of example as having a single extension axis A. However, it is contemplated by the present disclosure for extension 14 to have one or more bends and/or to be bendable. Thus, the extension axis A when referencing telescoping device 26 is defined as the axis through extension 14 in the region of the telescoping device.

Rotation device 28 is configured to allow the rotation of gripping head 16 about extension axis A. Again, the extension axis A when referencing rotation device 28 is defined as the axis through extension 14 in the region of the rotation device.

Rotation device 28 is configured to allow the rotation of gripping head 16 to any desired position or to specifically preselected position (e.g., every 15 degrees, every 45 degrees, etc.). Trigger assembly 12 is configured to retain the operative engagement between gripping head 16 and trigger 18 regardless of the length of extension 14 as adjusted by telescoping device 26 and of the rotated position of the gripping head as adjusted by rotation device 28.

It should be recognized that telescoping device 26 is shown along the length of extension 14 by way of example only. However, it is of course contemplated by the present disclosure for telescoping device 26 to find equal use at any position on extension 14, between the extension and trigger assembly 12, between the extension and gripping head 16, and any combinations thereof.

It should also be recognized that rotation device 28 is shown at the connection of extension 14 and gripping head 18 by way of example only. However, it is of course contemplated by the present disclosure for rotation device 28 to find equal use at any position on extension 14, between the extension and trigger assembly 12, between the extension and gripping head 16, and any combinations thereof.

Gripping head 18 is described in detail with reference to FIGS. 3-9. In the illustrated embodiment, gripping head 18 has gripping jaws 22, 24 where each jaw 22, 24 is substantially identical to one another. Of course, it is contemplated by the present disclosure for jaws 22, 24 to be configured the same or different from one another. Moreover, it is contemplated for gripping jaws 22, 24 to include more than two jaws.

Jaws 22, 24 include a main member 30, a first-grip member 32, and a second-grip member 34. Main members 30 are operatively connected to trigger assembly 12 for movement about pivot B. First and second grip members 32, 34 are secured to main members 30 and move together with the main member.

In the illustrated embodiment, jaws 22, 24 have two second-grip members 34, one on an upper side of main member 30 and one on a lower side of the main member. In this manner, second-grip members 34 can provide additional support and structural rigidity to main member 30. Of course, it is contemplated by the present disclosure for jaws 22, 24 to have only one second-grip member 34.

Figure 3:
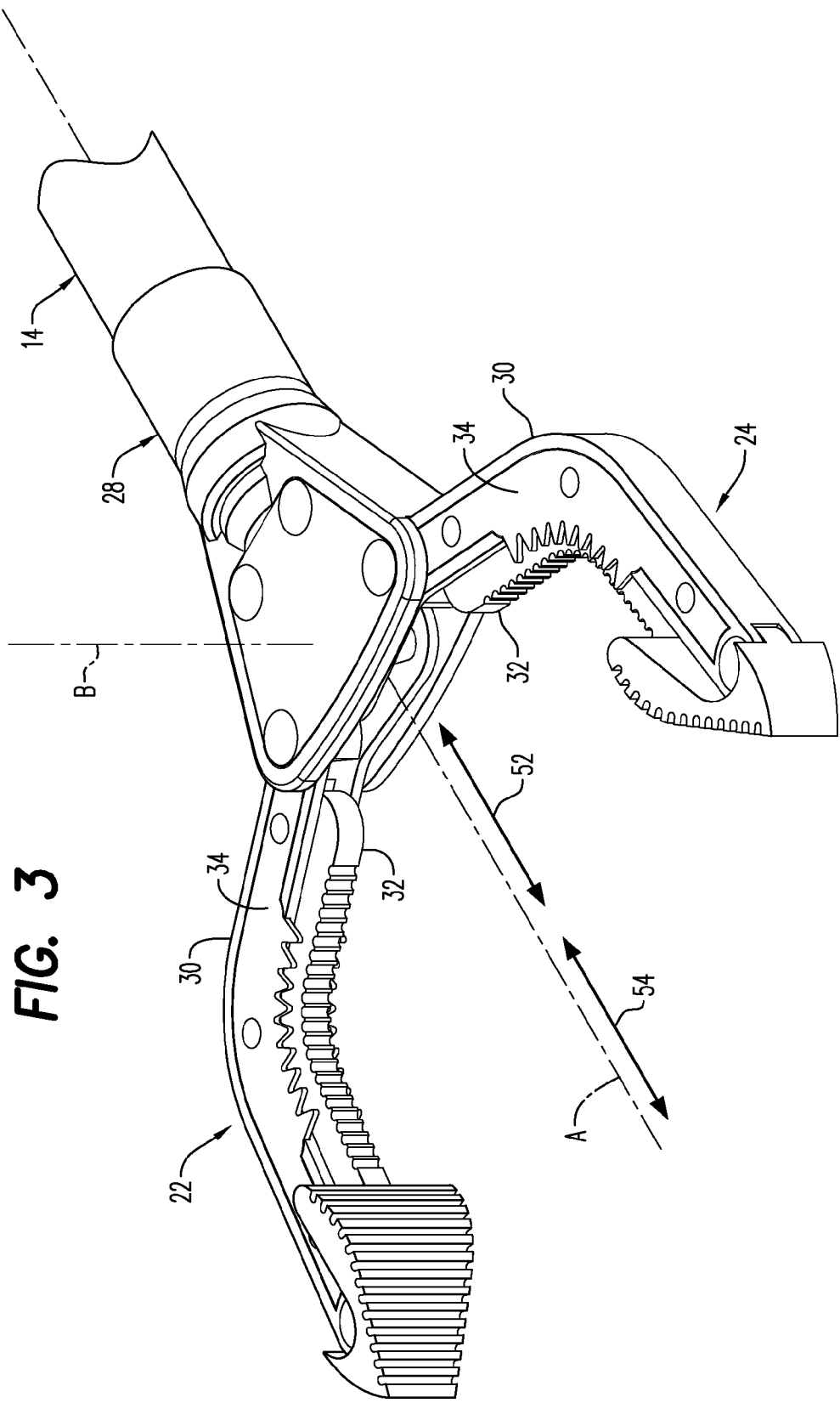
FIG. 3 is a magnified view of a gripping head according to the present disclosure in the normal or unactuated state.
Figure 4:
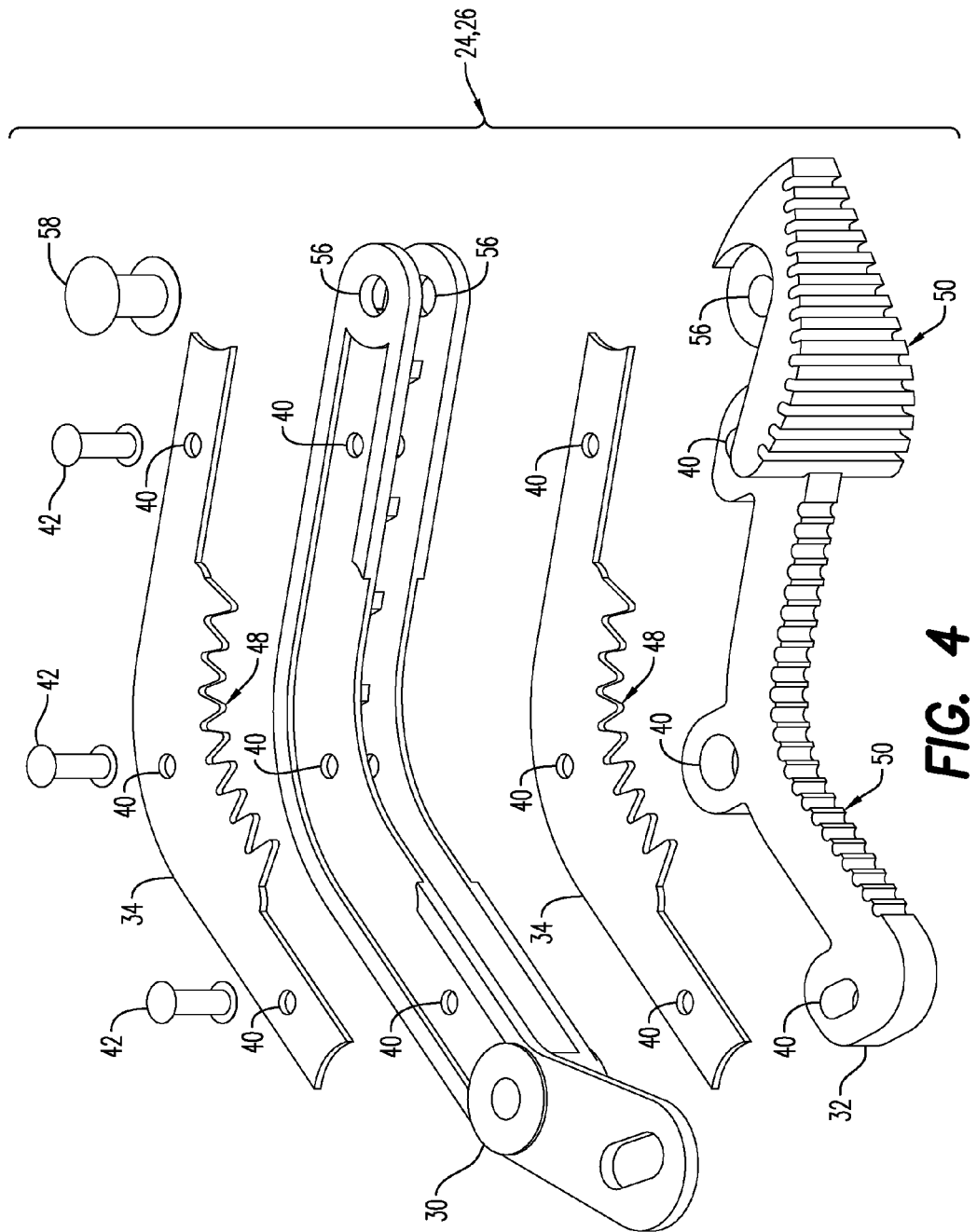
FIG. 4 is a partially exploded view of a jaw of the gripping head of FIG. 3.
Figure 5:
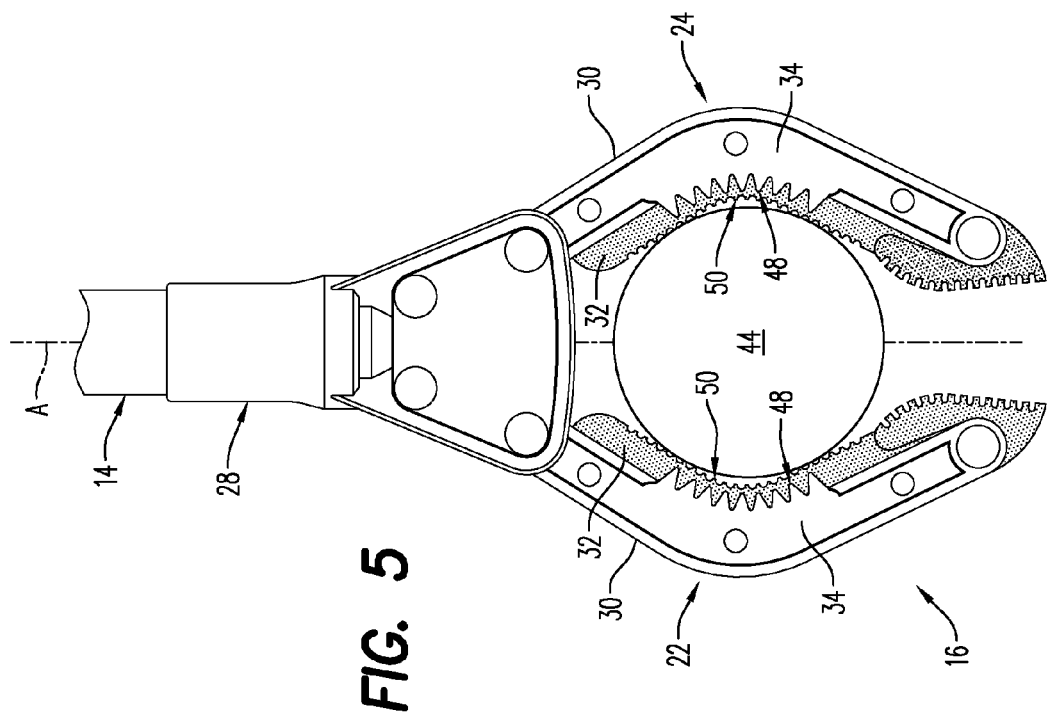
FIG. 5 illustrates the gripping head of FIG. 3 in a first actuated state.
Figure 7:
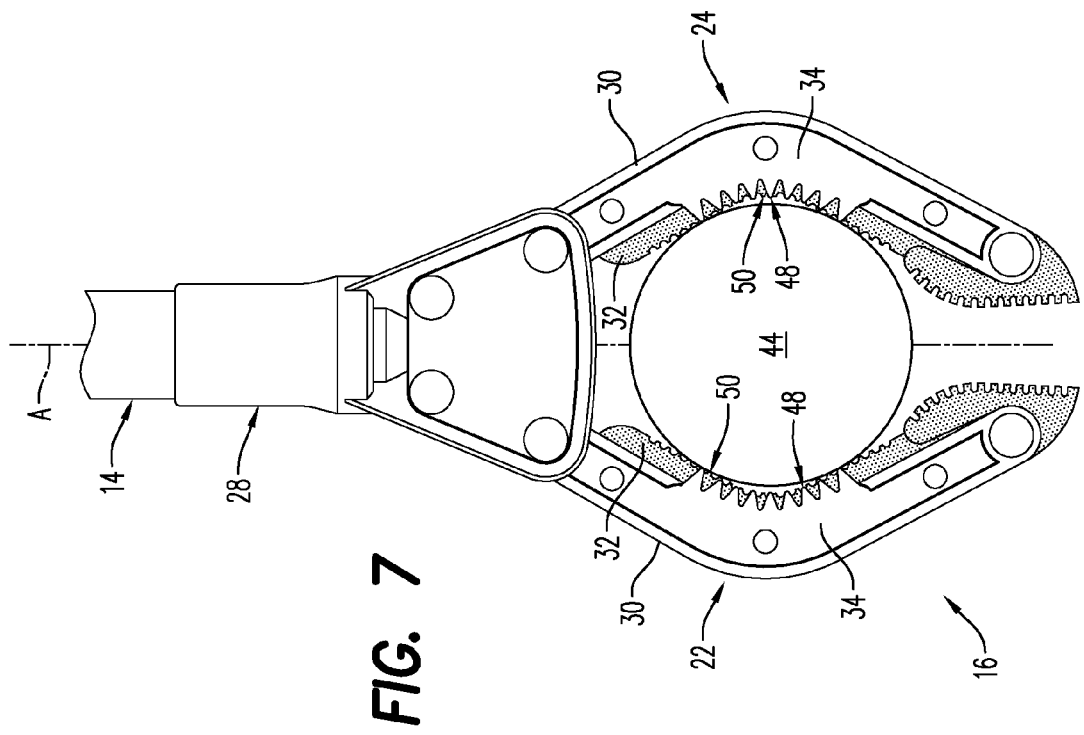
FIG. 7 illustrates the gripping head of FIG. 3 in a second actuated state.

First-grip member 32 extends towards grip axis B (i.e., towards item 44) more than second-grip member 34 in the normal or unactuated state (FIG. 3). Advantageously, jaws 22, 24 are configured in a manner that allows first-grip member 32 to elastically move with respect to main and second-grip members 30, 34 in a direction away from grip axis B based on a gripping pressure exerted on the item being gripped as shown in FIGS. 5, 7, and 9.

In the illustrated embodiment, main member 30, first-grip member 32, and second-grip member 34 are secured to one another via a plurality of openings 40 and pins 42 in a manner that allows elastic movement of the first-grip member with respect to the main and second-grip members in the direction of the grip axis B. Openings 40 are illustrated as being oversized with respect to pins 42, which allows first-grip member 32 to move with respect to main member 30.

In some embodiments, first-grip member 32 is secured to main member 30 with a gap 46 defined therebetween. Gap 46 provides a relief area for deflection or movement of first-grip member 32.

Of course, it is contemplated by the present disclosure for main member 30, first-grip member 32, and second-grip member 34 to be secured together in any desired manner that allows elastic movement of the first-grip member.

Also in the illustrated embodiment, first-grip member 32 is has a lower rigidity than second-grip member 34, which also allows elastic movement of the first-grip member. Here, first-grip member 32 can be formed of an elastomeric member and second-grip member 34 can be formed of a metallic member such as, but not limited to, stainless steel, carbon steel (heat treated or not heat treated), aluminum, and others. Additionally, it is contemplated by the present disclosure for the lower rigidity of first-grip member 32 to be provided by one or more spring members (not shown) connecting the first-grip member to the main and/or second-grip member 30, 34.

As used herein, the phrase "lower rigidity" when used to describe movement of first-grip member 32 with respect to second-grip member 34 relates to the ability of the first-grip member to "elastically move"—via deflection and/or compression and/or bending—with respect to the second-grip member. The elastic movement between first and second grip members 32, 34 can be provided by one or more attributes of the first-grip member such as, but not limited to, the shape, the durometer, and others; by one or more attributes of the second-grip member such as, but not limited to, the shape, the durometer, and others; by one or more attributes of main member 30 such as, but not limited to, the shape, the durometer and any combinations thereof; by one or more additional members; and any other combinations.

The elastic movement of first-grip member 32 allows gripping head 16 to provide the plurality of gripping states, where each gripping state applies a different type of gripping force to item 44 being grasped. FIGS. 5-6, 7-8, and 9-10 illustrate different gripping states available from gripping head 16, respectively.

Figure 6:
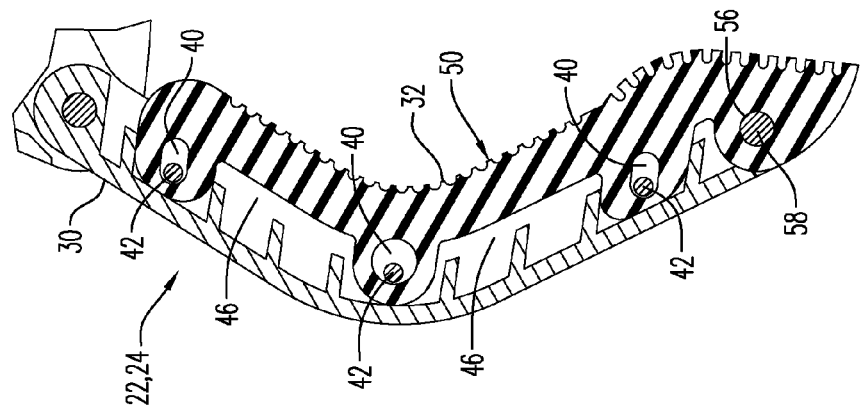
FIG. 6 illustrates the gripping head of FIG. 5 having certain portions removed for clarity.

Tool 10 is illustrated in FIGS. 5-6 having gripping item 44 with a first gripping state. The first gripping state is illustrated with a low grip pressure applied to item 44 via head 16. The pressure at the first gripping state is not sufficient to move first-grip member 32 with respect to main and second-grip members 30, 34 to a degree sufficient to result in the second-grip members contacting the item. As a result, only first-grip member 32 contacts item 44, which provides the first gripping state.

Upon release of the pressure to item 44, first-grip member 32 elastically returns to a normal position with respect to main and second members 30, 34. In the illustrated embodiment where first-grip member 32 is formed of an elastomeric material, the first-grip member elastically returns to its original position.

Jaws 22, 24 are illustrated in the first gripping state in FIG. 6 with various components omitted for clarity. Here, it can be seen first-grip member 32 has not been elastically moved with respect to main or second-grip members 30, 34 to a degree sufficient to allow contact between the second-grip member and item 44.

Figure 8:
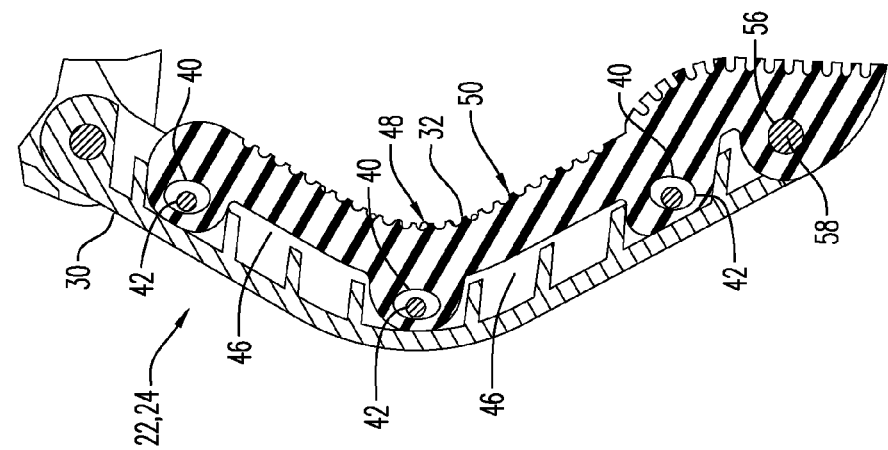
FIG. 8 illustrates the gripping head of FIG. 8 having certain portions removed for clarity.

Tool 10 is illustrated in FIGS. 7-8 having gripping item 44 with a second gripping state. The second gripping state is illustrated with a medium grip pressure applied to item 44 via head 16. The pressure at the second gripping state is sufficient to move first-grip member 32 with respect to main and second-grip members 30, 34 to a degree sufficient to result in the second-grip members contacting the item. As a result, both first and second-grip members 32, 34 contact item 44, which provides the second gripping state. Upon release of the pressure to item 44, first-grip member 32 elastically returns to a normal position with respect to main and second-grip members 30, 34.

Tool 10 is illustrated in FIGS. 9-10 having gripping item 44 with a third gripping state. The third gripping state is illustrated with a high grip pressure applied to item 44 via head 16. The pressure at the third gripping state is sufficient to move first-grip member 32 with respect to main and second-grip members 30, 34 to a degree sufficient to result in the second-grip members contacting the item, as well as to embed portions 48 of second-grip member in the item. Of course and depending on the design of item 44, it is possible for portions 48 of second-grip member 34 to deform or deflect the item in the third gripping state instead of embedding in the item.

As a result, both first and second-grip members 32, 34 contact item 44 and the portions of second-grip members embedded in the item and/or deflecting the item together provide the third gripping state. Upon release of the pressure to item 44, first-grip member 32 elastically returns to a normal position with respect to main and second-grip members 30, 34.

In the illustrated embodiment of second-grip member 34, portions 48 are illustrated as teeth or crenulations. Of course, it is contemplated by the present disclosure for portions 48 to have any desired configuration such as, but not limited to, a cutting blade. Further, it is contemplated by the present disclosure for first-grip member 32 to include grip enhancing protrusions 50 defined on one or more surfaces.

Also in the illustrated embodiment, tool 10 is shown having gripping head 16 with both jaws 22, 24 having first and second gripping members 32, 34 configured to elastically move with respect to one another. However, it is contemplated by the present disclosure for only one of jaws 22, 24 to be so configured. Moreover, it is contemplated by the present disclosure for the jaw 22, 24 configured for such elastic movement to be movable by trigger assembly 12 or to be stationary.

Returning to FIG. 3, another feature of gripping head 16 is disclosed. Gripping head 16 is partitioned into a central region 52 and a terminal region 54. Terminal region 54 is located remote from extension 14 at an end of grip axis B, while central region 52 is located proximate the extension in a center area along grip axis B. Here, gripping head 16 is further configured so that first-grip member 32 in the area of terminal region 54 is configured to not move with respect to main or second-grip members 30, 34, but rather to only compress as a result of a gripping force—providing a fourth gripping state.

By way of example and best seen in FIG. 6, first-grip member 32 can be secured to main and second-grip members 30, 34 via an opening 56 and pin 58—where the opening and pin have substantially the same dimensions to prevent movement with respect to the tool axis A and lacking gap 46 therebetween discussed above.

It should be recognized that jaws 22, 24 are described above by example only having first-grip member 32 being a single, unitary member secured by a four-point connection of using openings and pins 40, 42, 56, 58. Of course, it is contemplated for first-grip member 32 to have one or more segments, for the securement to be formed by as many desired connections as necessary, for the connections to be formed by any desired mechanical connector, and any combinations thereof.

Thus, gripping head 16 is configured to provide one or more regions (only one shown) that provide multiple gripping states and, in some embodiments, to provide one or more regions (only one shown) that provides a single gripping state.

It should be recognized that head 16 is discussed above as having the plurality of gripping states provided in central region 50 of the head and a single gripping state at terminal region 52. Of course, it is contemplated by the present disclosure for gripping head 16 to be configured to have the plurality of gripping states at central region 50 only, at terminal region 52 only, or at both the central and terminal regions.

It is also contemplated by the present disclosure for tool 10 to include one or more magnetic regions (not shown) on one or more of trigger assembly 12, extension 14, and gripping head 16 as desire.

Figure 11:
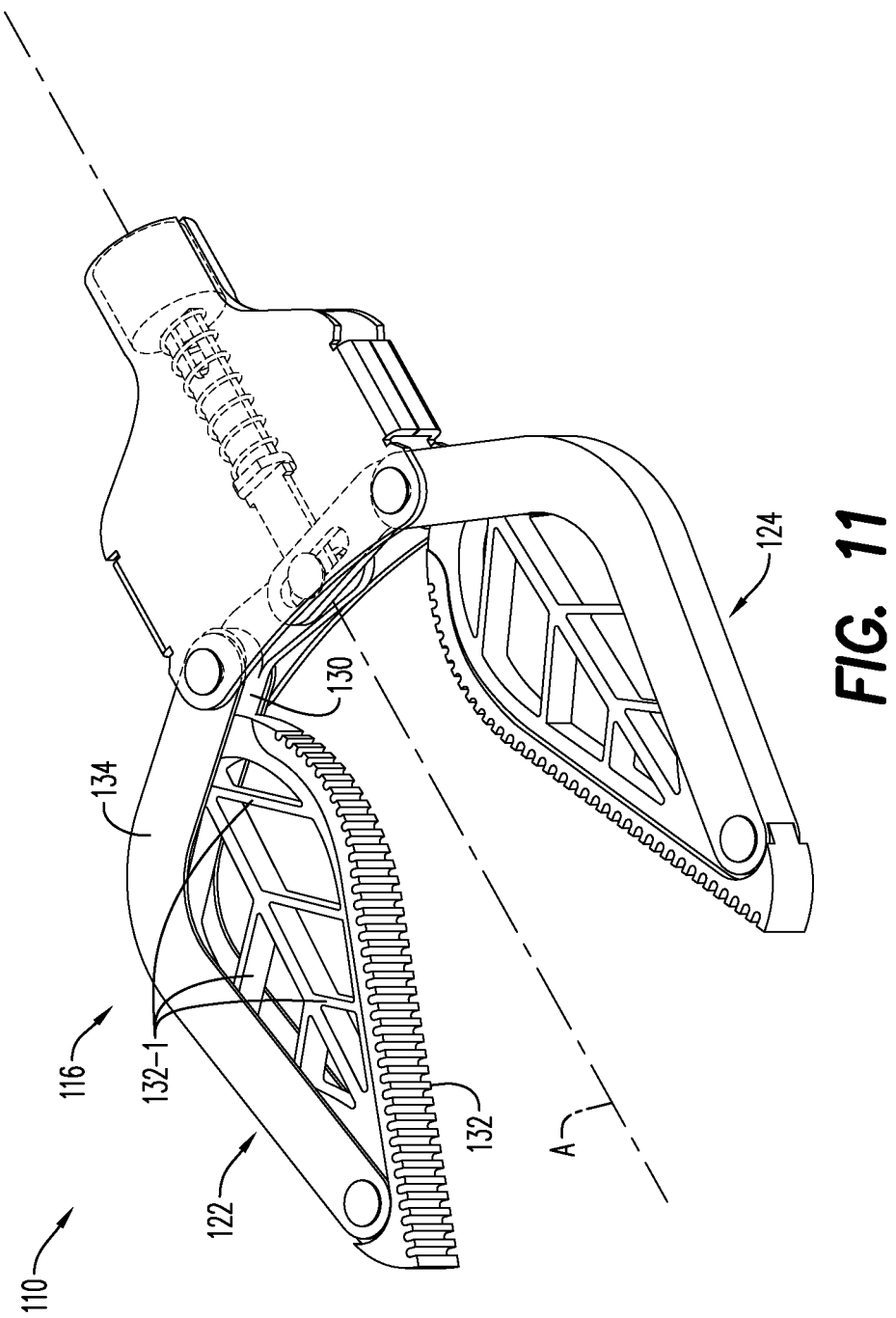
FIG. 11 is a front perspective view of an alternate exemplary embodiment of a reaching and grasping tool according to the present disclosure in a normal or unactuated state.

Referring now to FIG. 11, an alternate exemplary embodiment of a reaching and grasping tool 110 according to the present disclosure in a normal or unactuated state is shown. Here, component parts performing similar and/or analogous functions to those discussed above with respect to tool 10 are labeled in multiples of 100.

Tool 110 includes gripping head 116 having jaws 122, 124—at least one of which includes a main member 130, a first-grip member 132, and a second-grip member 134. In this embodiment, first-grip member 132 includes a plurality of ribs 132-1 that are configured to elastically move—in this embodiment deflect and/or bend—with respect to grip axis B depending on the gripping force to the item being grasped. Thus in this embodiment, one or more portions of plurality of ribs 132-1 act as springs to provide elastic movement.

As with tool 10 discussed in detail above, gripping head 116 is configured to allow elastic movement of first-grip member 132 with respect to main and second-grip members 130, 134 to provide differing grip states that include contact between the item and only the first-grip member, contact between the item and both first and second grip members, and contact between the item and the first-grip member together with embedding and/or deflection of the item by the second-grip member.

It will be appreciated that the present disclosure that the various embodiments of gripping head disclosed herein provide for elastic movement of the first-grip member with respect to the second-grip member—which provides for different gripping states depending on the gripping force. The elastic movement is provided in tool 10 by compression and/or deflection of first-grip member 32. Similarly, the elastic movement is provided in tool 110 by compression and/or deflection of spring like portions of first-grip member 132.

Of course, it is contemplated by the present disclosure for the elastic movement between the first and second grip members to be provided in any desired way. For example, it is contemplated by the present disclosure for the first and second grip members to have one or more springs (e.g., coil spring, leaf spring, etc) that provide for elastic movement, where the spring(s) can be integral to or separate from the first-grip member and/or the second-grip member and/or the main member.

Figure 12:
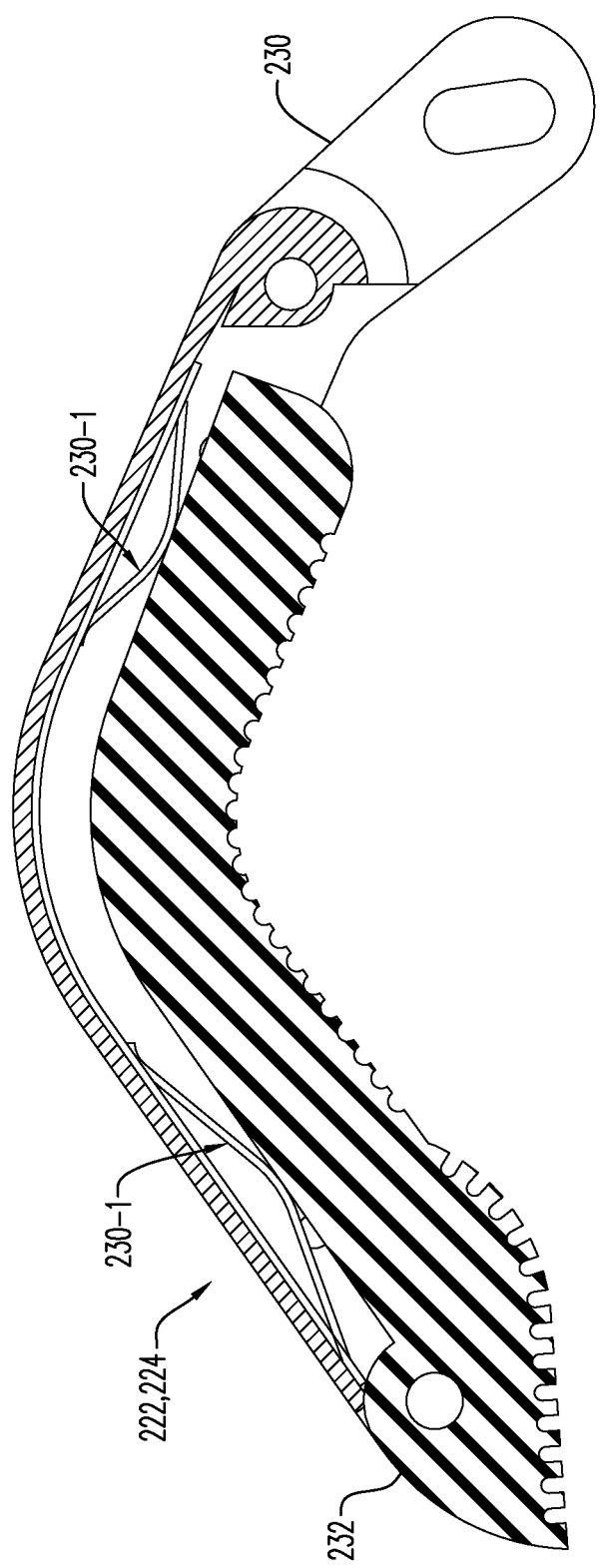
FIG. 12 illustrates another exemplary embodiment of a gripping head according to the present disclosure having certain portions removed for clarity.

By way of example only, an exemplary embodiment of a jaw 222, 224 is illustrated in FIG. 12 having main member 230 and first-grip portion 232 with a spring member having leaf springs 230-1 positioned therebetween. Leaf springs 230-1 are shown as a unitary member positioned between main member 230 and first-grip portion 232. In this manner, gripping forces applied to first-grip portion 232 can elastically move the first-grip portion with respect to main member 230 on which the second grip portion (not shown) is secured.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the present disclosure.

What is claimed is:

1. A reaching and grabbing tool, comprising:
a trigger assembly having a trigger and a handle;
a gripping head having at least one jaw operatively connected to the trigger for movement with respect to a gripping axis; and
an extension operatively connecting the trigger assembly and the gripping head,
the gripping head has at least one jaw that includes a main member, a first-grip member, and a second-grip member, the first and second grip members are secured to the main member along a region of the gripping axis so that the first-grip member extends towards the gripping axis more than the second-grip member in a normal or unactuated state and so that the first-grip member deflects or elastically moves with respect to main and second-grip members in a direction away from gripping axis based on a gripping pressure exerted on an item being gripped to provide a plurality of different gripping states in the region, and
the first-grip member being secured to the main member with a gap defined therebetween, the gap providing a relief area for the deflection or elastic movement of the first-grip member.

2. The tool of claim 1, wherein more than one jaw of the gripping head are configured for movement about the gripping axis.

3. The tool of claim 1, wherein more than one jaw of the gripping head comprises the main member, the first-grip member, and the second-grip member.

4. The tool of claim 1, wherein the at least one jaw that comprises the main member, the first-grip member, and the second-grip member is the same as the at least one jaw that is operatively connected to the trigger.

5. The tool of claim 1, wherein the plurality of different gripping states comprises a first gripping state in which only the first-grip member contacts the item.

6. The tool of claim 5, wherein the plurality of different gripping states comprises a second gripping state in which the first-grip member and the second-grip member contacts the item.

7. The tool of claim 6, wherein the plurality of different gripping states comprises a third gripping state in which the first-grip member contacts the item and a portion of the second-grip member is embedded in and/or deforms the item.

8. The tool of claim 7, wherein the portion comprises a plurality of teeth.

9. The tool of claim 1, wherein the region is a central region of the gripping head.

10. The tool of claim 1, wherein the region is a terminal region of the gripping head.

11. The tool of claim 1, wherein the region is a central region and a terminal region of the gripping head.

12. The tool of claim 1, wherein the first and second grip members are secured to the main member along another region of the gripping axis so that the first-grip member only compressibly moves with respect to the main and second-grip members in a direction away from the gripping axis based on the gripping pressure to provide a single gripping state in the other region.

13. The tool of claim 12, wherein the region is a central region of the gripping head and the other region is a terminal region of the gripping head.

14. The tool of claim 1, wherein the handle extends at an angle from an extension axis defined by the extension.

15. The tool of claim 1, further comprising a telescoping device configured to allow the extension to be lengthened or shortened along an extension axis defined by the extension.

16. The tool of claim 1, further comprising a rotation device configured to allow the gripping head to rotate about an extension axis defined by the extension.

17. The tool of claim 1, wherein the second-grip member comprises one second-grip member on an upper side of the main member and one second-grip member on a lower side of the main member.

18. The tool of claim 1, wherein the second-grip member comprises metal.

19. The tool of claim 1, wherein the first-grip member comprises an elastomeric material.

20. The tool of claim 19, wherein the first-grip member further comprises teeth.

21. A reaching and grabbing tool, comprising:
a trigger assembly having a trigger and a handle;
a gripping head having at least one jaw operatively connected to the trigger for movement with respect to a gripping axis; and
an extension operatively connecting the trigger assembly and the gripping head,
the gripping head has at least one jaw that includes a main member, a first-grip member, and a second-grip member, the first and second grip members are secured to the main member along a region of the gripping axis so that the first-grip member extends towards the gripping axis more than the second-grip member in a normal or unactuated state and so that the first-grip member elastically moves with respect to main and second-grip members in a direction away from gripping axis based on a gripping pressure exerted on an item being gripped to provide a plurality of different gripping states in the region, wherein the gripping head comprises a spring that provides for the elastic movement between the first and second grip members.

22. A reaching and grabbing tool, comprising:
a trigger assembly having a trigger and a handle; and
a gripping head being operatively connected to the trigger for movement with respect to a gripping axis,
the gripping head having at least one jaw comprising a main member, a first-grip member, and a second-grip member, the first and second grip members are secured to the main member along a region of the gripping axis so that the first-grip member extends towards the gripping axis more than the second-grip member in a normal or unactuated state and so that the first-grip member elastically moves with respect to main and second-grip members in a direction away from gripping axis based on a gripping pressure exerted on an item being gripped, and
the main member, the first-grip member, and the second-grip member being secured to one another via a plurality of openings and pins, openings in the first-grip member being oversized with respect to the pins to allow the first-grip member to move with respect to the second-grip and main members.

* * * * *